BROWN & CRANS.
Harvester.
No. 2,542.
Patented April 6, 1842.
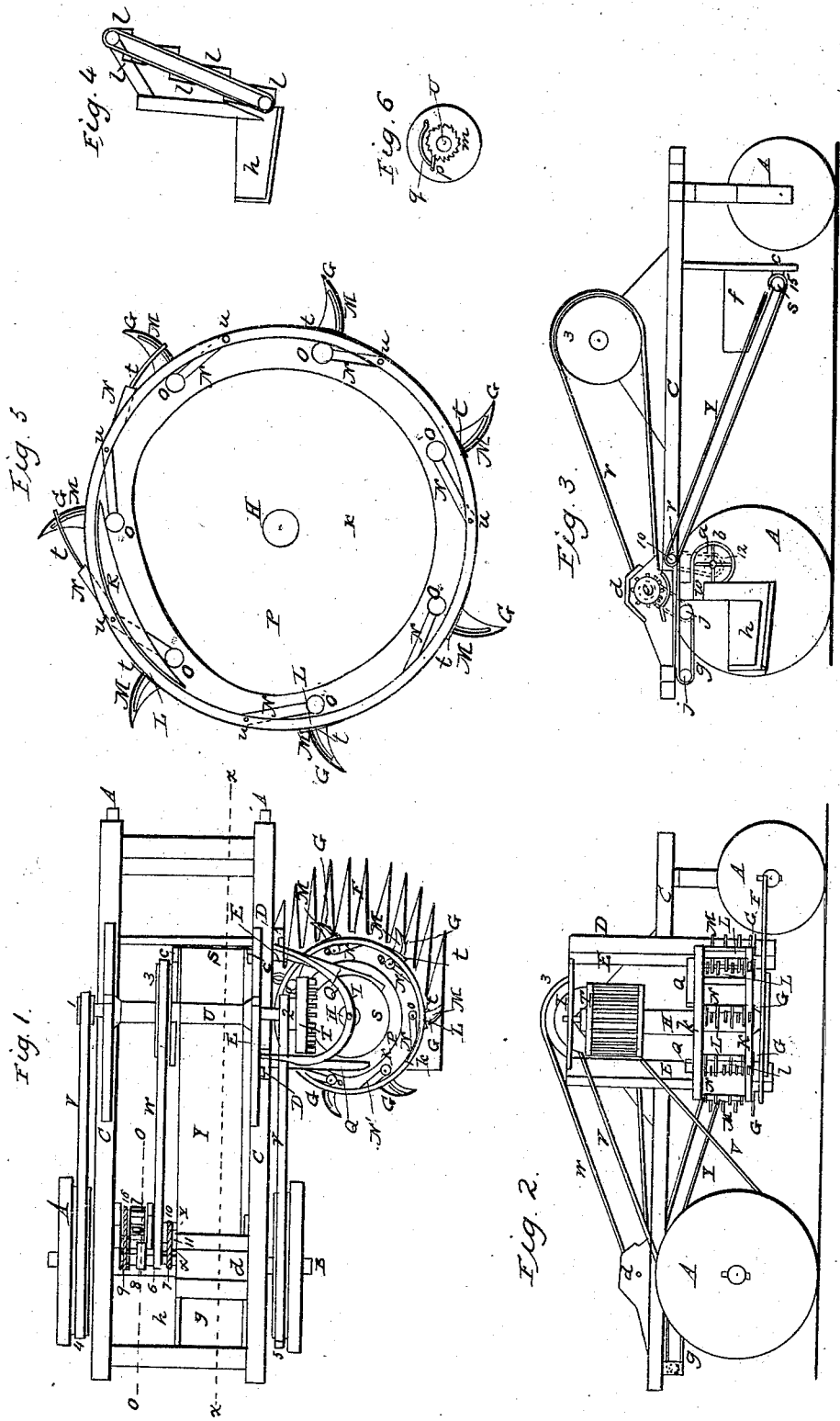

UNITED STATES PATENT OFFICE.

CHS. BROWN AND F. S. CRANS, OF BARTON, NEW YORK.

IMPROVEMENT IN CUTTING AND CLEANING GRAIN.

Specification forming part of Letters Patent No. 2,542, dated April 6, 1842.

*To all whom it may concern:*

Be it known that we, CHAS. BROWN and FRANCIS S. CRANS, of Barton, in the county of Tioga and State of New York, have invented a new and useful machine for cutting, thrashing, winnowing, and bagging grain in the field by horse or other power, called the "Improved Harvester," which is described as follows, reference being had to the annexed drawings of the same, making part of this specification.

Figure 1 is a plan or top view; Fig. 2, side elevation; Fig. 3, vertical section at the dotted line $x\ x$ of Fig. 1 through the conveyer fan, and thrashing-cylinder and concave, the screen, and receiver; Fig. 4, vertical section at $o\ o$ of Fig. 1 through the elevators and grain-receiver; Fig. 5, plan of cutting and gathering wheel; Fig. 6, elevation showing one of the ratchet-wheels fixed to the horizontal shaft and the pawl dropping into the teeth of said wheel, fixed to one of the loose pulleys on said shaft.

Similar letters refer to corresponding parts.

This machine consists of four wheels, A A A A, two axles, B B, and a frame, C, adapted to receive the machine hereinafter described, resembling the wheels and axles of a common wagon, with a tongue by which the animals move the machine forward or backward.

On one side of the frame are secured two vertical parallel timbers, D D, grooved on the sides toward each other in the manner of the fender-posts of a saw-mill. Between these timbers is placed a vertical adjustable frame, E, having tongues on the outer edges fitting and corresponding with the grooves aforesaid, and moving in them when the said frame is raised or lowered, for the purpose hereinafter described.

A horizontal plate, F, called the "finger-plate," projects outward at right angles from said frame, fastened thereto by suitable braces or fixtures, the front side of said plate being formed into pointed fingers for gathering in the grain between said fingers to be cut by the revolving scythes G, which move horizontally over them in a circular direction. A vertical axle, H, turns in a step in the center of the aforesaid horizontal finger-plate F, its upper gudgeon turning in an aperture or box fixed in a brace, I, fastened to the top of said adjustable frame E, so that when said frame and finger-plate are raised or lowered the axle H and cutting-wheel will rise or fall with them, said frame being fixed at any required height by pins, stops, or other fixtures. A revolving wheel, K, for cutting the grain and conveying it to a revolving apron, Y, is formed on said axle H. This wheel is composed of a cylindrical horizontal solid wheel, through the center of which the shaft H passes, and around the circumference of which, on the under side, the scythes G for cutting the grain are fastened, the cutting-edges radiating from the center of the wheel and placed at equal distances apart, and the ends projecting a suitable distance beyond the periphery to cut the grain. Above each of these scythes rises a vertical post, L, from said wheel, in which posts are fastened bent teeth M, arranged in the manner of a cradle, forming as many rakes as there are scythes, for gathering and carrying round the grain to the apron when cut. On the heads of these posts is fixed a horizontal circular rim, $k$. Between this rim $k$ and the wheel K and the posts L are arranged a number of levers, N, moving on gudgeons $u$ projecting from either side and entering apertures in the rim $k$ and wheel K, having in their outer ends, which project beyond the rim, curved teeth $t$, which lie between the teeth M of the rakes while the machine is cutting, and when required to discharge the grain from the rakes M these teeth $t$ of the said levers are caused to move outward toward the points of the teeth M of the rakes in the manner hereinafter described. These levers N and teeth $t$ are called "dischargers." On the other ends of said levers, which are inside the rim, are vertical gudgeons, on which are placed antifriction rollers $o$, for the purpose hereinafter described.

An eccentric or cam wheel, P, is arranged and fixed inside the rim $k$ and on the same horizontal plane, secured in that position by horizontal braces, Q, fastened to it and to the rising and falling frame E, before described. A segment, R, is placed between the eccentric wheel P and the rim $k$, and secured in that position by brace Q, fastened to it and to the eccentric wheel and frame E. The vertical shaft H passes through the eccentric-wheel P. A trundle-head, S, is fixed on the upper end of the vertical shaft H. A crown-wheel, T, fixed on the end of a horizontal revolving shaft, U, turning on the top of the frame c, gears into said trundle-head S. On said horizontal shaft U are fixed three pulleys, 1 2 3, one of which, 3, is larger than the other two. Bands V V pass over the two small pulleys 1 2, which are loose on said shaft except when geared to it by ratchets and pawls, and over two large pulleys, 4 5, on the hind wheels or axle-tree of the wagon. A band, W, passes over the large pulley 3 and over a small pulley, 6, on the horizontal axle of a common thrashing-cylinder, e, turning in the upper part of the rear end of the frame C of the machine, on which axle there are three other small parallel pulleys, 7 8 9, of unequal diameters, around one of which, 7, being a small pulley, a band, X, passes, leading to a pulley, 10, on the upper roller, r, of the inclined conveyer Y or endless band for conveying the grain from the gathering-wheel K to the thrashing-cylinder e, said roller r being placed parallel to the horizontal axle of the thrashing-cylinder; and over the other pulleys, 11, on the said roller r a band passes, leading to a pulley, 12, on the axle of the winnowing-machine or fan a, placed beneath the said roller r, and another band, i, to the upper roller 16 of the elevators l, for elevating the thrashed and winnowed grain, said elevator being made in the usual manner and arranged at the rear end of the frame C, left side, looking toward the horses.

The concave c and thrashing-cylinder e are made, in the usual manner, with teeth for separating the grain, and arranged in the upper part of the frame C, covered by a cap, d. The lower rollers, s, of the conveying-band or conveyer Y, is placed parallel to the upper roller r, and cylinder e turns in the frame C near the finger-plate F and cutting-wheel. The upper roller r turns in front of the thrashing-cylinder e, and, as before stated, parallel therewith.

A vertical guard, f, which is simply a plain thin board, is arranged and secured on the left side of the conveyer Y, near the lower roller, s, being fastened to the frame C in any convenient manner for preventing the escape of the grain therefrom as received from the gathering-wheel by confining the grain upon said revolving conveyer Y.

The elevators l are made in the usual manner, and arranged in the frame C to the left of the fan, or at the opposite side of the frame C from that in which the thrashing-cylinder and fan are placed, and extending to the lower end of the grain-receiver h, where they revolve in an opening therein for taking up the grain.

An endless horizontal screen, g, and conveyer for screening the grain and conveying away the straw when thrashed and winnowed is arranged under the thrashing-cylinder and concave, at the rear thereof, in any convenient manner, by means of transverse parallel rollers j j turning in the frame C, turned by bands and pulleys.

Under the screen g, and fixed to the frame C, is arranged a receiver or box, h, for receiving the grain as it passes through the screen, having an inclined bottom for conveying the grain to the elevators l. The grain passes through an aperture in the lower end thereof into said elevators or buckets l, which pass through said aperture. The bottom of said receiver or box inclines downward from the screen to the elevators and sidewise toward the elevators, for causing the grain to descend to the said elevators. The blast from the fan a, covered by the usual case, b, passes upward through a space, w, between the upper part of said receiver h and the screen g, and through said screw g. The small pulleys 1 2 are geared to the horizontal shaft U by pawl p and ratchet-wheels m, the pawls being attached to the pulleys and the ratchet-wheels to the shaft V, the pulleys turning loosely on the shaft when the machine is backing, and locked together when the machine moves forward, the pawls being held in gear with the ratchet-wheel by springs q.

Operation: The machine being drawn forward among the grain, the fingers F take it between them, the revolving scythes G cut off the heads, the rakes M gather them and carry them round to the revolving conveyer Y, and when by the side of the conveyer the dischargers t are thrown outward from the wheel and discharge the grain from the rakes M upon the conveyer Y by the small anti-friction rollers O upon the inner ends of the levers N striking against the side of the segment R next the cam P, which cause the ends of the levers N, containing the rollers O, to move toward the center of the wheel, while the opposite ends containing the teeth or dischargers are simultaneously thrown out from the wheel, carrying the grain with them and depositing it upon the conveyer Y. When these rollers have passed the segment R they strike against the outer surface of the cam-wheel P, which causes them to move in a contrary direction, or from the center, returning the dischargers to their former position between the teeth of the rakes and close against the posts L until they again arrive at the segment R, when they are again thrown out. The conveyer Y conveys the grain to the thrashing-cylinder e and concave c, where it is thrashed, as in other thrashing-machines. Being thus thrashed, it, with the straw, is thrown upon the endless revolving screen g, where it is met by the blast from the fan, which blows the chaff and straw off at the rear, while the grain falls through the screen to the receiver h below it, which, having an inclined bottom, conveys it to the aperture at the lower end thereof, where the elevators l are placed, and these revolving at the same time carry up the cleaned grain to the bags or other places where it is to be deposited. When it is required to cut higher or nearer the top of the grain the frame E, with the cutting-wheel K and fingers F, is raised in the grooves of the vertical timbers D and secured by pins or other fixtures; and when it is required to cut nearer the surface of the ground a reverse movement of the frame takes place.

In backing the machine the bands and pulleys are prevented from acting by the ratchet-wheels $m$ of the shaft slipping over the pawls $p$ of the loose pulleys 1 2, which locks the said pulleys to the horizontal shaft as the machine advances.

We do not claim as our invention merely discharging the grain from the teeth or rake M by means of other fingers passing between them, as this has been done before by stationary fingers; but What we do claim as our invention, and desire to secure by Letters Patent, is—

The mode of discharging the grain from the rake M by means of the movable dischargers $t$, operated by the cam P and segment R, as herein described.

CHARLES BROWN.
FRANCIS S. CRANS.

Witnesses:
ARTHUR YATES,
JOHN G. WASHBON.